United States Patent [19]

Mikol

[11] Patent Number: 5,287,882

[45] Date of Patent: Feb. 22, 1994

[54] BALL COCK ASSEMBLY FLOAT WITH DRAIN OPENINGS

[75] Inventor: Erwin F. Mikol, Westlake, Ohio

[73] Assignee: Moen Incorporated, Elyria, Ohio

[21] Appl. No.: 59,305

[22] Filed: May 11, 1993

[51] Int. Cl.⁵ .................. F16K 31/24; F16K 33/00
[52] U.S. Cl. ........................... 137/410; 4/324;
        4/366; 4/415; 73/322.5; 137/426; 137/430;
        137/432; 137/441; 137/444
[58] Field of Search ............. 137/410, 426, 427, 429,
        137/430, 432, 437, 444, 441; 4/324, 366, 381,
        384, 415; 73/322.5

[56] References Cited

U.S. PATENT DOCUMENTS

| | | | |
|---|---|---|---|
| 1,778,114 | 10/1930 | Mace | 73/322.5 |
| 2,809,656 | 10/1957 | Goldtrap | 137/432 |
| 3,115,153 | 12/1963 | Delamater | 137/426 |
| 3,115,893 | 12/1963 | Doyle | 137/432 |
| 3,194,070 | 7/1965 | Grant | 137/432 |
| 3,428,078 | 2/1969 | Christopher | 137/427 |
| 3,554,219 | 1/1971 | Hudson | 137/432 |
| 3,610,271 | 10/1971 | Jarvis | 73/322.5 |
| 3,729,017 | 4/1973 | Brandelli | 137/432 |
| 4,189,795 | 2/1980 | Conti et al. | 4/324 |
| 4,431,024 | 2/1984 | Gallagher | 137/426 |
| 4,600,031 | 7/1986 | Nestich | 137/432 |
| 4,703,653 | 11/1987 | Schoepe et al. | 4/366 |
| 4,794,946 | 1/1989 | Antunez | 137/426 |
| 5,035,257 | 7/1991 | Antunez | 73/322.5 |

Primary Examiner—George L. Walton
Attorney, Agent, or Firm—Kinzer, Plyer, Dorn, McEachran & Jambor

[57] ABSTRACT

A toilet tank ball cock is designed for use in a toilet tank having an operating lever, a flush valve controlled by the operating lever and a water supply, with the ball cock regulating the supply of water to the tank. The ball cock includes a vertical riser column communicating with the water supply and a water control valve regulating the flow of water from the water supply to the toilet tank. There is a float movable on the riser column and coupled to the water control valve such that downward movement of the float to a selected level opens the water control valve to fill the toilet tank and upward movement of the float to a selected upper level closes the water control valve to stop filling the tank. The float has openings therein in communication with the tank interior. The openings are located to provide for water flow from the float as the water level in the tank drops. The openings are sized so that the combined weight of the float and the water therein will not cause the water supply valve to open when the tank is slowly drained, as by a leak, but the combined weight will cause the water supply valve to open when the tank is rapidly drained, as by opening the flush valve.

9 Claims, 2 Drawing Sheets

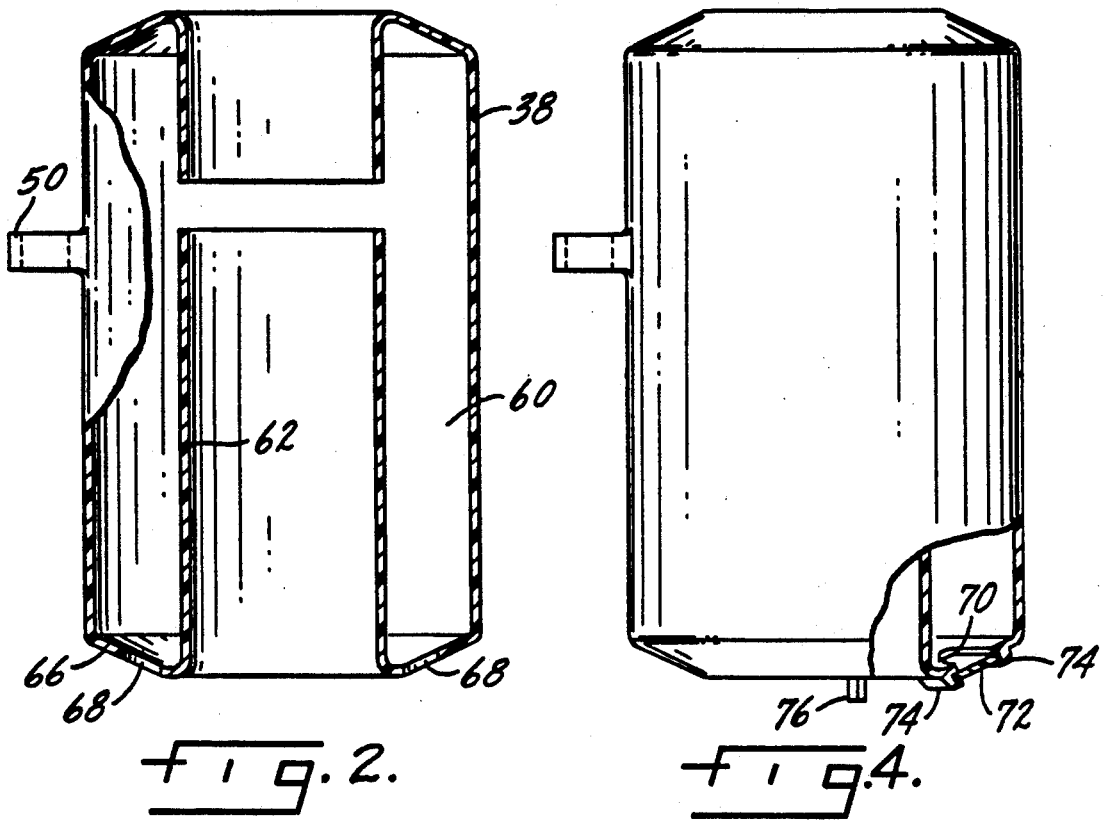
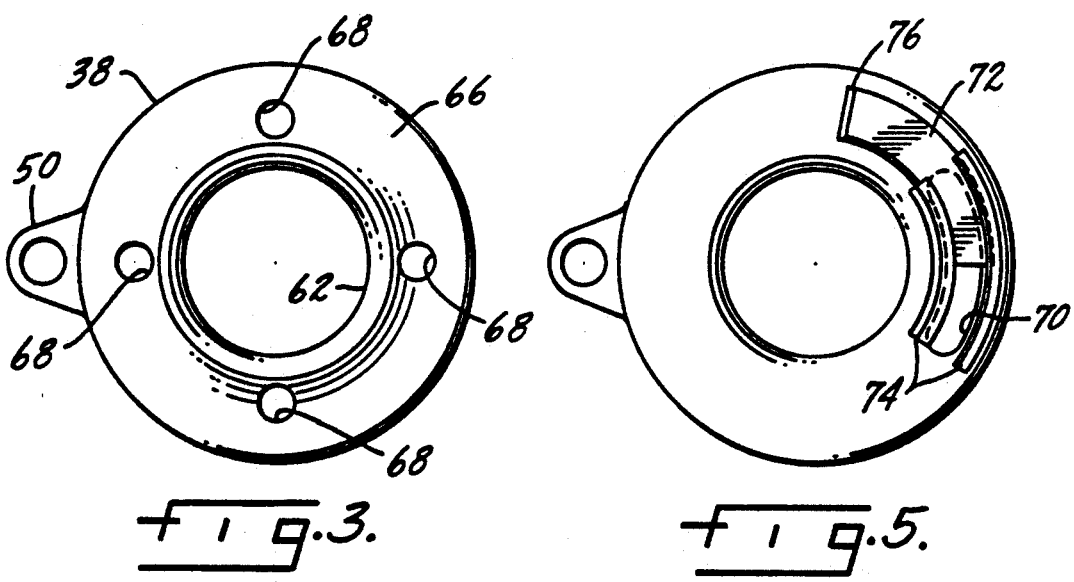

BALL COCK ASSEMBLY FLOAT WITH DRAIN OPENINGS

THE FIELD OF THE INVENTION

The present invention relates to toilet tank ball cocks which are normally used to discharge a measured volume of water from a toilet tank to an adjacent toilet bowl to flush the bowl. Such ball cocks are shown in U.S. Pat. No. 5,211,204 issued May 18, 1993 and assigned to the assignee of the present application. During normal operation, the toilet is flushed every time the handle is operated and the discharge of water from the tank is triggered by removal of the stopper or flush valve at the bottom of the tank. The refill cycle for the tank is initiated when the ball cock float, which moves with the water level in the tank, has reached a predetermined lower level. This opens the ball cock control valve permitting water to pass through the ball cock and into the tank. It is not uncommon for toilet tanks to have some leakage. Most often the leak is where the stopper valve closes the tank outlet, as with time such valves may deteriorate. A slow leak of this nature can go undetected for a long period of time and may result in the tank being perpetually refilled, whenever the volume of water in the tank has reached a sufficiently low level to trigger opening of the water control valve. The end result is a substantial waste of water, a concern in a great many communities in which water supplies are limited. The present invention is particularly directed to preventing the ball cock float from initiating a refill cycle for the tank when the lowering of the water level is slow, for example due to leakage, but yet permitting the refill or water control valve to operate normally when the toilet is flushed under conventional operating conditions.

SUMMARY OF THE INVENTION

The present invention relates to toilet tank ball cocks and in particular to an improved ball cock which will not institute a refill cycle when the lowering of the water level in the tank is due to a condition other than a normal flushing operation.

A primary purpose of the invention is a ball cock of the type described in which the ball cock float, which controls the water refill valve, has one or more openings located and sized to control the combined weight of the float and the water therein so that the refill cycle is only started when a toilet is flushed in the conventional manner.

Another purpose of the invention is a ball cock as described in which the ball cock float has a plurality of opening which face the bottom of the tank.

Another purpose of the invention is a ball cock float as described having a variably sized opening, with the particular size of the opening being determined by the specific application and location of the ball cock.

Another purpose is a ball cock assembly for use in tank type toilets in which the ball cock float has at least one opening adjacent its lower end which faces the bottom of the tank to permit the discharge of water from the float as the float is lowered coincident with a lowering tank water level.

Other purposes will appear in the ensuing specification, drawings and claims.

BRIEF DESCRIPTION OF THE DRAWINGS

The invention is illustrated diagrammatically in the following drawings wherein:

FIG. 2 is a side view, in part section, illustrating the ball cock float;

FIG. 3 is a bottom view of the ball cock float of FIG. 2;

FIG. 4 is a side view, in part section, illustrating a modified embodiment of ball cock float; and FIG. 5 is a bottom view of the ball cock float of FIG. 4.

DESCRIPTION OF THE PREFERRED EMBODIMENT

Figure 1:
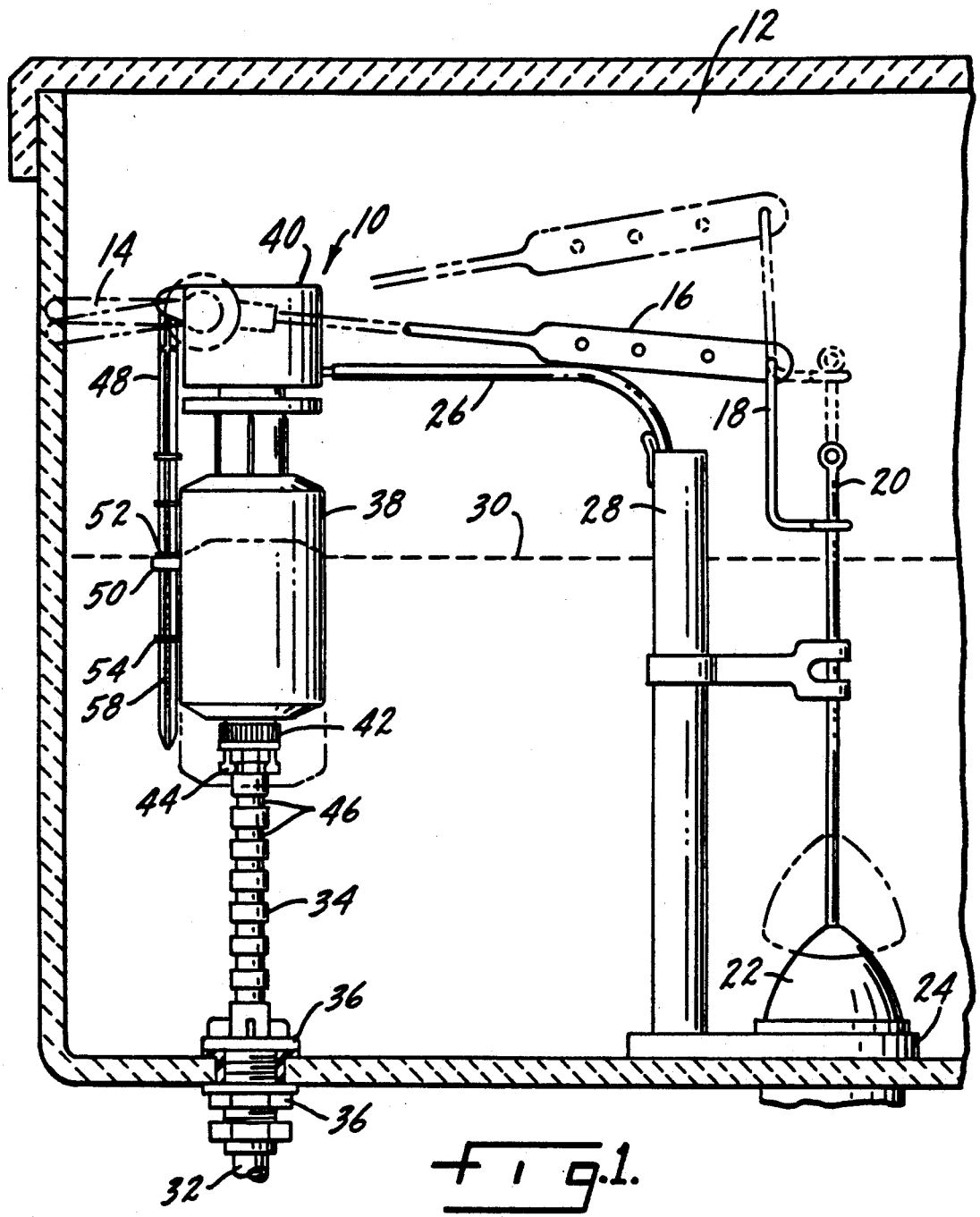
FIG. 1 is a partial side view of a toilet tank incorporating the ball cock of the present invention.

Toilet tank ball cocks are used to control the refilling of the tank after a flushing operation. In ball cocks of the type disclosed herein there is a float which moves between spaced stops with the lowering of the float to the lower stop opening the ball cock refill valve and the raising of the float to the upper stop closing the refill valve. The float will contain water from the tank and will rise and fall with the water level within the tank. It is not uncommon for toilet tanks to leak after having been in service for an extensive period of time. Normally, the leakage is adjacent the stopper or flush valve which is lifted to empty a measured volume from the tank into the adjoining toilet. Such leaks can go undetected for a long period of time and with ball cocks of the type described can cause perpetual refilling of the tank even though it is not flushed. This is brought about by the float being lowered with the water level in the tank and the weight of the water in the float triggering opening of the refill valve to cause a refill cycle, even though the tank hasn't been flushed. The present invention overcomes this problem by the simple expedient of providing a plurality of openings in the bottom of the float, which openings will permit water within the float to drain so that the water level in the float, when the water level in the tank gradually lowers, as by leakage, is consistent with the tank water level. Accordingly, when the tank water level has been lowered by leakage, at the time the water level is below the float, the float is essentially emptied of water and will not have sufficient weight to trigger an opening of the refill valve. Thus, the only time the refill valve will operate is when the toilet is flushed in the conventional manner.

In FIG. 1 the ball cock assembly is indicated generally at 10 and is positioned within a toilet tank 12. There is a hand lever 14 which is connected to a lever 16 attached to an arm 18 which is connected to a stem 20. The stem 20 carries a stopper valve 22 at its lower end with the stopper valve functioning as a flush valve to open and close a toilet tank opening 24 which is connected to the toilet bowl. The above-described structure is conventional and well known in the art.

The ball cock assembly 10 has a fill tube 26 extending outwardly therefrom which will discharge water into a pipe 28 through which the tank 10 is filled. A conventional water level for the tank is indicated by the dotted line 30.

The water supply for the tank 10 is indicated by a pipe 32 which will pass water into a riser tube 34, with the riser tube being connected to the tank by a pair of mounting nuts 36 threaded onto the tube on opposite sides of the tank bottom. A float 38 is movable up and down on the riser tube to control operation of the refill valve which is positioned within the cap 40 of the ball cock assembly 10. The position of the ball cock assembly on the riser tube 34 is determined by a lock collar 42 having a plurality of retaining members 44 which will fit within a designated one of the grooves 46 on the riser tube. Thus, the height of the ball cock assembly on the riser tube is adjustable, depending upon the desired volume of flow from the toilet tank.

A linkage rod 48 is connected to the water control valve within the cap 40 such that lifting of the rod upward closes the water control valve to shut off water flow to refill tube 26 and a lowering of the linkage 48 opens the refill or water control valve to permit water to flow into the tank from the supply conduit 32. The float 38 has an integral ring 50 extending outwardly from its side and the linkage rod 48 slides through the ring. Linkage rod 48 may carry a pair of O-rings indicated at 52 and 54, which O-rings are adjustably positioned within notches 58 of the linkage rod 48. The O-rings function as the upper and lower stops on the linkage rod. When an O-ring is contacted by the ring 50 it will cause the linkage rod to move up or down as the situation dictates to open or close the refill valve.

In normal operation, when the handle 14 is pivoted it will move lever 16 in an upward direction, as shown in broken lines in FIG. 1, to raise the stopper 22. Water will flow out of the tank 12 to an adjacent toilet. As the water level in the tank goes down, float 38, which is filled with water to the level in the tank, will move down with the tank water level. At such time as ring 50 contacts O-ring 54, linkage rod 48 will move down, opening the refill valve within cap 40. Water will flow through the riser tube and into refill tube 26 and into the toilet tank. As the water level within the tank rises, so will the float. When ring 50 contacts O-ring 52, the linkage rod 48 will rise and close the refill valve within cap 40.

Details of the float are illustrated in FIGS. 2 and 3. Float 38, which may be made of a suitable plastic, has a hollow circumferential chamber 60 which surrounds a passage 62 through which the riser tube 34 extends. The bottom 66 of the float may have a plurality of spaced openings 68 which face the bottom of the tank and will permit water to flow into and out of chamber 60. The number and size of openings 68 will vary, as may the particular location and placement of these openings. What is important is that the openings permit water to flow out of chamber 60 as the float is lowered with lowering water level in the tank. During a normal flushing operation, the openings will not permit sufficient water to be discharged to materially affect the weight of the float and thus operation of the float in instituting a tank refill will be normal. However, if the water level is lowered by leakage, draining the tank will be quite slow and the water level within float chamber 60 will remain generally coincident with the water level in the tank. Thus, at the time the water level in the tank is just below the bottom of the float, the float should be substantially empty of water. An empty float does not have sufficient weight to move the linkage rod 48 downward to open the refill valve. Accordingly, the refill cycle will not be instituted when the toilet tank is leaking and the float moves down as a result of that leakage because the float does not have sufficient weight to move the linkage rod.

FIGS. 4 and 5 show a further embodiment and illustrate a variably sized opening. In this case the opening is formed by an arcuate slot 70, again located in the bottom of the float. A slide 72, movable in a pair of spaced arcuate slideways 74, by use of a small handle 76, may be used to control the size of opening 70 which is open to water flow. The size of the opening will depend upon the prevailing water pressure, as you need to maintain sufficient water within the float to cause the ball cock assembly to operate normally, but yet permit adequate drainage from the float so that the weight of the float and the water in it will not trigger a refill cycle due to leakage of water from the toilet tank.

Whereas the preferred form of the invention has been shown and described herein, it should be realized that there may be many modifications, alterations and substitutions thereto.

The embodiments of the invention in which an exclusive property or privilege is claimed are defined as follows:

1. A toilet tank ball cock for use in a toilet tank having an operating member, a flush valve controlled thereby, and a water supply, with the ball cock controlling the supply of water to the tank, said ball cock including a vertical riser column communicating with the water supply, a water control valve regulating the flow of water from the water supply through the riser column to the toilet tank, a float movable on said riser column and coupled to said water control valve such that downward movement of the float to a selected level may open the water control valve to fill the toilet tank and upward movement of the float to a selected upper level closes the water control valve to stop filling the tank, said float having opening means therein in fluid communication with the water within the tank interior, said opening means being located to provide for water flow from the float into the tank as the water level in the tank drops, said opening means being sized such that water will pass from the float to maintain a water level in the float consistent with the water level in the tank when the tank is slowly drained, as by leakage so that the combined weight of the float and the water therein will not cause the water supply valve to open when the tank is slowly drained, as by leakage, but the combined weight will cause the water valve to open when the tank is rapidly drained by opening the flush valve operator member.

2. The ball cock of claim 1 further characterized in that said opening means includes at least one hole in the bottom of said float.

3. The ball cock of claim 2 further characterized in that said opening means includes a plurality of holes in the bottom of said float.

4. The ball cock of claim 1 further characterized in that said opening means includes at least one opening adjacent the lower end of said float.

5. The ball cock of claim 1 further characterized in that said opening means includes at least one opening facing the bottom of the tank.

6. The ball cock of claim 1 further characterized in that said opening means includes a variable sized opening.

7. The ball cock of claim 6 further characterized by and including mechanical means for varying the size of said opening.

8. The ball cock of claim 7 further characterized in that said opening is an arcuate slot.

9. The ball cock of claim 8 further characterized by and including a slide member for varying the size of said arcuate slot which communicates the interior of said float with the water in said tank.

* * * * *